(12) United States Patent
Lung et al.

(10) Patent No.: US 12,005,611 B2
(45) Date of Patent: Jun. 11, 2024

(54) METHOD OF MOLDING SPOKES OF A NON-PNEUMATIC TIRE USING AN ARRAY OF MOLDS

(71) Applicants: Compagnie Generale des Etablissements Michelin, Clermont-Ferrand (FR); David C Lung, Simpsonville, SC (US); Robert Gaut, Powdersville, SC (US)

(72) Inventors: David C Lung, Simpsonville, SC (US); Robert Gaut, Powdersville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 243 days.

(21) Appl. No.: 17/772,750

(22) PCT Filed: Nov. 27, 2019

(86) PCT No.: PCT/US2019/063554
§ 371 (c)(1),
(2) Date: Apr. 28, 2022

(87) PCT Pub. No.: WO2021/107944
PCT Pub. Date: Jun. 3, 2021

(65) Prior Publication Data
US 2022/0388203 A1    Dec. 8, 2022

(51) Int. Cl.
*B29C 33/30* (2006.01)
*B29C 33/72* (2006.01)
(Continued)

(52) U.S. Cl.
CPC ............ *B29C 33/301* (2013.01); *B29C 33/72* (2013.01); *B29C 43/02* (2013.01); *B29C 43/36* (2013.01);
(Continued)

(58) Field of Classification Search
CPC ....... B29D 30/02; B29C 33/301; B29C 43/02; B29C 43/36; B60B 9/26; B60C 7/18; B60C 7/146
See application file for complete search history.

(56) References Cited

U.S. PATENT DOCUMENTS

| 1,750,263 A * | 3/1930 | Gammeter | B29D 30/065 |
| | | | 425/34.1 |
| 2019/0030964 A1* | 1/2019 | Narowski | B29D 30/02 |

FOREIGN PATENT DOCUMENTS

| WO | 2019132911 A1 | 7/2019 |
| WO | 2019132912 A1 | 7/2019 |
| WO | 2019132914 A1 | 7/2019 |

OTHER PUBLICATIONS

European Patent Office, International Search Report dated Jul. 14, 2020, pp. 1-10 (included), European Patent Office, Rijswijk, The Netherlands.

* cited by examiner

*Primary Examiner* — Jerzi H Moreno Hernandez
(74) *Attorney, Agent, or Firm* — Neal P. Pierotti

(57) ABSTRACT

A method of curing spokes is provided in which first molds of a first and second series of molds are placed into a platen press, and force and heat applied. The platen press is opened and the first mold of the first series is moved relative to the platen press while the position of the first mold of the second series is kept the same relative to the platen press. Force and heat are applied to the molds. The platen press is opened, and the first mold of the first series is removed while the second mold of the first series is kept within the platen press. A cured spoke is removed from the first mold of the first series.

14 Claims, 10 Drawing Sheets

(51) Int. Cl.
  *B29C 43/02* (2006.01)
  *B29C 43/36* (2006.01)
  *B29D 30/02* (2006.01)
(52) U.S. Cl.
  CPC ........ *B29D 30/02* (2013.01); *B29C 2043/366* (2013.01)

METHOD OF MOLDING SPOKES OF A NON-PNEUMATIC TIRE USING AN ARRAY OF MOLDS

CROSS-REFERENCE TO RELATED APPLICATIONS

The present application is a 35 U.S.C. § 371 application of PCT/US2019/063554 filed on Nov. 27, 2019 and entitled "Method of Molding Spokes of a Non-Pneumatic Tire Using an Array of Molds." PCT/US2019/063554 is incorporated by reference herein in its entirety for all purposes.

FIELD OF THE INVENTION

The subject matter of the present invention relates to a method of molding spokes of a non-pneumatic tire by utilizing an array of molds that can cycle through a platen press. More particularly, the present application involves a method of manufacturing spokes in which the molds are sequentially moved through a platen press during curing with following molds taking their place in sequence.

BACKGROUND OF THE INVENTION

Non-pneumatic tires are those that do not require air or other fluid for their inflation for use. Some non-pneumatic tires have a plurality of spokes arranged circumferentially around and attached to a hub. On their opposite end, the spokes are attached to a shear band. To build the spoke component of the non-pneumatic tire, it is known to combine various products into a multi-component product and then cure this product in a mold. One type of mold used in the production of spokes is a mold that features segments that engage the spoke on the top, bottom, left and right hand sides. The segments of the mold are fastened, bolted, screwed, or otherwise secured into one another to form a closed compartment that engages the spoke and applies pressure thereon. Spokes of a particular size/configuration that require the same time for curing are placed into individual molds and force and heat are applied until the right amount of curing is achieved. The molds are then opened, the spokes removed, and the molds are refilled with new green spokes for subsequent curing. The process of loading the molds, demolding, and placing the molds into a press is done manually and is highly labor intensive. The process of molding a product may involve a press having the top and bottom portions shaped to receive and form the product to be molded, and this top and bottom are attached to the press and are not removable therefrom, instead the products are themselves put into and pulled out of these press molds.

The construction of multi-sized non-pneumatic tires requires the construction of spokes that are of different sizes, strengths, and configurations. Although it is known to use fixed molds to mold products, and to use a press to mold a single product, there remains a need to mold spokes having different cure time requirements in an efficient manner. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a method for molding spokes 10 of a non-pneumatic tire 66. The method utilizes a platen press 12 into which various molds 70 in an array that carry green spokes 20 are positioned. Some of the molds 70 are arranged to mold spokes 10 that have different cure times. This may be because the size and/or composition of the spokes 10 are not the same. Spokes 10 having different cure times are simultaneously present within the platen press 12 and heat and force is applied to the molds 70 to cure the spokes 10. The platen press 12 can be opened to remove its force from the molds 70, and additional molds 70 with spokes 10 can be loaded into the platen press 12 and those spokes 10 that have been cured a sufficient amount may be removed from within the platen press 12. The molds 70 may be arranged in an array in a series of rows 32, 34, 36, 38, 40, 42 within the platen press 12 so that they are organized via their particular required cure time. The new molds 70 entering the platen press 12 are positioned into the rows 32, 34, 36, 38, 40, 42 corresponding to their particular required cure time and in so doing molds 70 on the other end of the rows 32, 34, 36, 38, 40, 42 that have been in the platen press 12 for their required amount of time are pushed out. The method thus allows for molding spokes 10 that have different cure times within the same platen press 12 at the same time. The spokes 10 with the different cure times may have the platen press 12 apply the same amount of force to all of them when in the platen press 12 during the curing.

Figure 1:
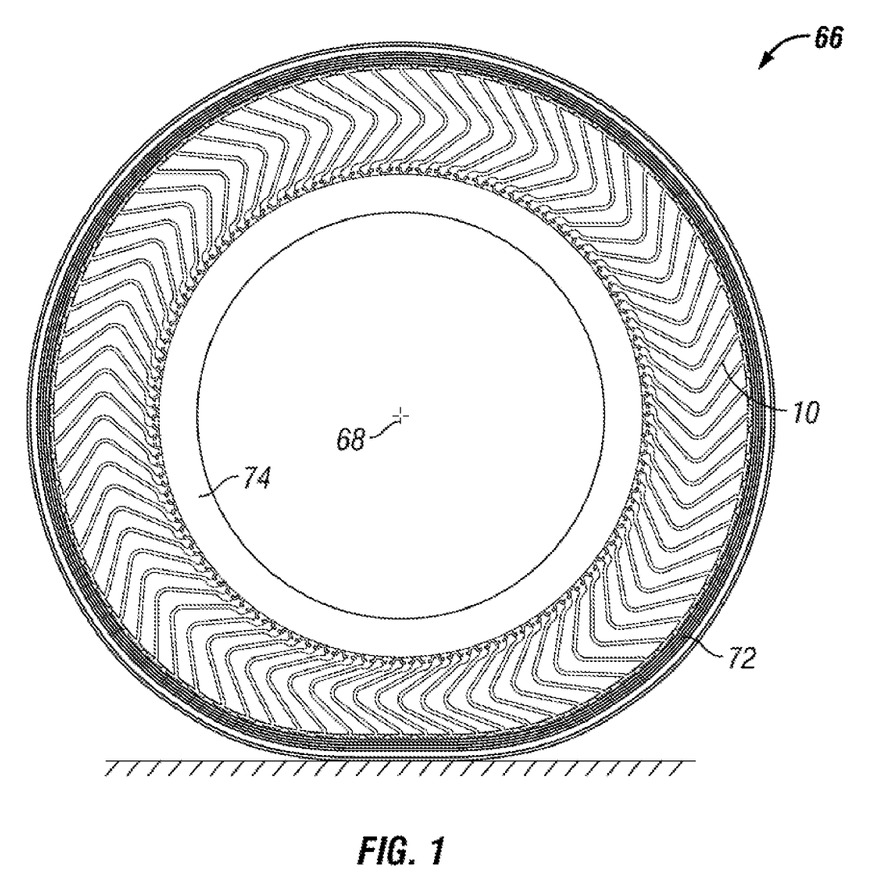
FIG. 1 is a side view of a non-pneumatic tire.

FIG. 1 shows a non-pneumatic tire 66. The non-pneumatic tire 66 has an axis 68 at its center, and the radial direction extends from the axis 68. Tread is located on the outer exterior of a shear band 72 and extends all the way around the non-pneumatic tire 66 in the circumferential direction. The shear band 72 is located inward in the radial direction from the tread and likewise extends 360 degrees around the axis 68 in the circumferential direction. A series of spokes 10 engage the shear band 72 and extend inward in the radial direction from the shear band 72 to a hub 74 of the non-pneumatic tire 66. Any number of spokes 10 can be present, and their cross-sectional shape can be different from that shown. In some instances, between 64-80 spokes 10 are present in the non-pneumatic tire 66. The hub 74 is located inward from the spokes 10 in the radial direction and can be mounted onto a wheel of the vehicle. The spokes 10 at the top of the non-pneumatic tire 66 are in tension, and the spokes 10 at the bottom are in compression as the non-pneumatic tire 66 rests on the ground and as the non-pneumatic tire 66 turns in normal operation of the vehicle.

Figure 2:
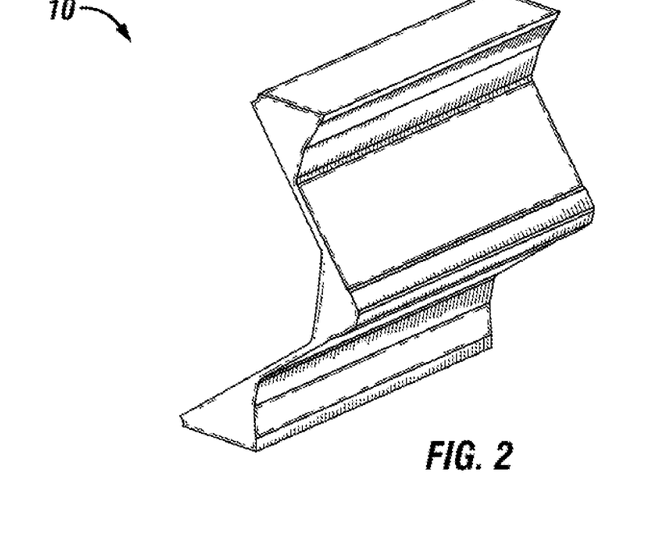
FIG. 2 is a perspective view of a spoke of a non-pneumatic tire in one embodiment.

The spoke 10 is shown in perspective view in FIG. 2 and includes a pair of legs that have triangular shaped ends. The central body of the spoke 10 is also made with a triangular shaped cross-section. The spoke 10 can be molded out of a single material, or may be made from a plurality of materials in some embodiments. Multiple layers of material can be placed onto one another and then positioned into the mold 70 for curing. It is to be understood that the shape and size of the spoke 10 formed by the mold 70 can be varied in accordance with different exemplary embodiments, and that a variety of spoke 10 configurations are possible. Materials making up the spoke 10 may include rubber, urethane, and/or polyurethane in accordance with different exemplary embodiments. The spoke 10 extends from a first end to a second end and may have an extension from end to end greater than, less than, or the same as the height of the spoke 10.

Figure 3:
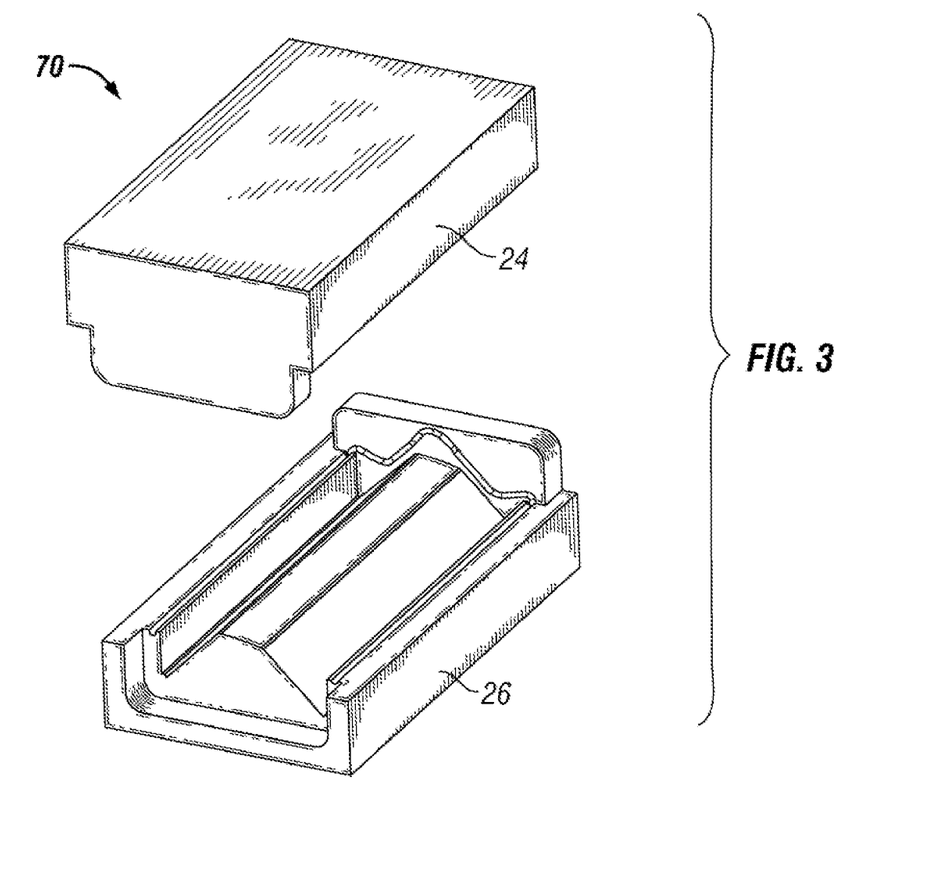
FIG. 3 is a perspective view of a mold for molding a spoke of a non-pneumatic tire that has a top piece and a bottom piece.

FIG. 3 shows the mold 70 in an open position and includes a top piece 24 and a bottom piece 26 that are complimentary to one another and designed for relative movement towards and away from one another. The bottom piece 26 has a first engagement surface that is sized and shaped for receipt of a green spoke 10. An uncured spoke is often referred to as a "green" spoke. The green spoke 10 engages the first engagement surface during curing of the spoke 10 and can sit on this surface during transport of the mold 70 through the process. The green spoke 10 can first be placed onto the first engagement surface of the bottom piece 26, free from engagement with the top piece 24, when the green spoke 10 first engages the mold 70. The top piece 24 has a second engagement surface that engages the spoke 10 during curing and has a shape complimentary to that of the first engagement surface so that the desired size and shape of the spoke 10 can be realized.

In use of the mold 70, the green spoke 10 is placed onto one of the first or second engagement surfaces and the top and bottom pieces 24, 26 are moved towards one another into the closed position. The spoke 10 engages both of the engagement surfaces and will have pressure and heat applied for an amount and time sufficient to cure the green spoke 20 and produce a cured spoke 22. The mold 70 can then be opened so that the top and bottom pieces 24, 26 are moved away from one another. The spoke 10 may be demolded from the top or bottom piece 24, 26 and the pieces 24, 26 can be prepared to receive a new green spoke 20 for subsequent molding. The pressure applied to the mold 70 may come from a platen press 12 that presses onto the mold 70 to in turn apply force to the spoke 10 within the mold 70. Heat can be transferred from the platen press 12 or some other source into the spoke 10 to effect curing of the spoke 10.

Figure 4:
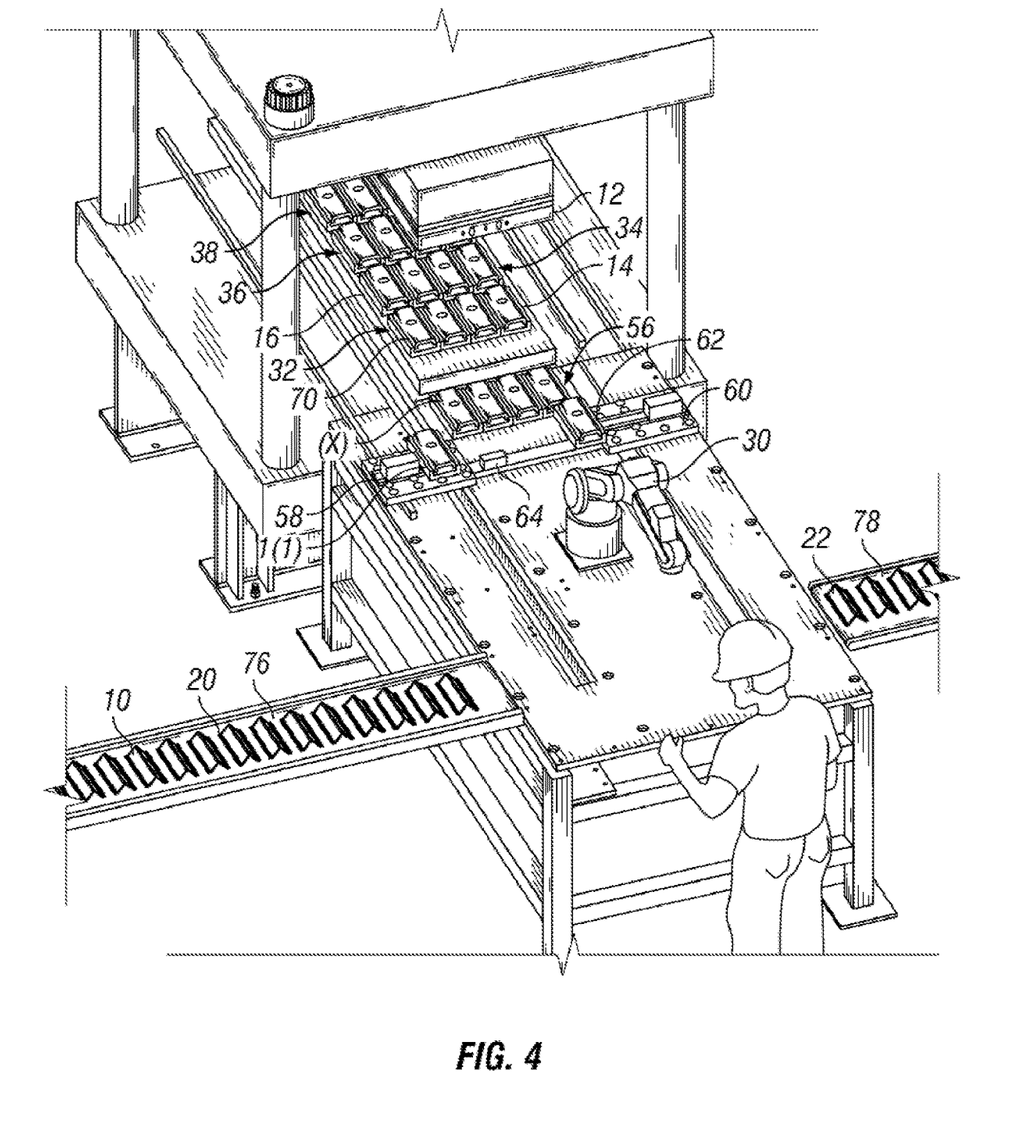
FIG. 4 is a perspective view of a station capable of molding spokes in accordance with one exemplary embodiment.

A perspective view of a section of a platen press 12 that can be used for applying force to molds 70 is illustrated with reference to FIG. 4. The method of molding the spokes 10 can be manual, automated, or have any combination of manual and automated steps for its execution. The method of molding includes conveying green spokes 20 via an uncured spoke transport 76, which can be a conveyor belt, to a loading area where they can be put into a mold 70 by a robot 30 or by a person, or by some combination of the two. Once molded, the cured spokes 22 can be transported away from the molding area via a cured spoke transport 78 which could also be a conveyor belt. In order to cure the green spoke 20 heat and force are applied to the green spoke 20 for an appropriate amount of time at which time the green spoke 20 becomes a cured spoke 22. It is to be understood that after exiting the platen press 12 the spoke need not be fully cured but could be just partially cured. In this regard, the cured spoke 22 exits the platen press 12 such that force is no longer applied to the cured spoke 22, but the cured spoke 22 is still warm and as it moves downstream from the platen press 12 it continues to cure just from the heat that has been transferred to it within the platen press 12. However, the spoke may be referred to as a cured spoke 22 after exiting the platen press 12 because it has undergone at least some curing or is in fact fully cured at this point.

The platen press 12 has a base onto which the molds 70 are positioned. A top section of the platen press 12 is movable relative to this base in the vertical direction. The top can be moved via one or more hydraulic cylinders in order to move down onto the molds 70 and squeeze the molds 70 between it and the base. Heating elements can be present in the base or in the top movable portion, or both, so that heat may be transferred into the molds 70 and into the green spokes 20 within the molds 70. The platen press 12 may be defined as the portion of the system in which molds 70 are positioned and force is applied to them by the top section and in which they are heated. The platen press 12 may or may not include the robot 30, the transports 76 and 78, and the mold open and close areas 62, 64 in some embodiments.

Figure 5:
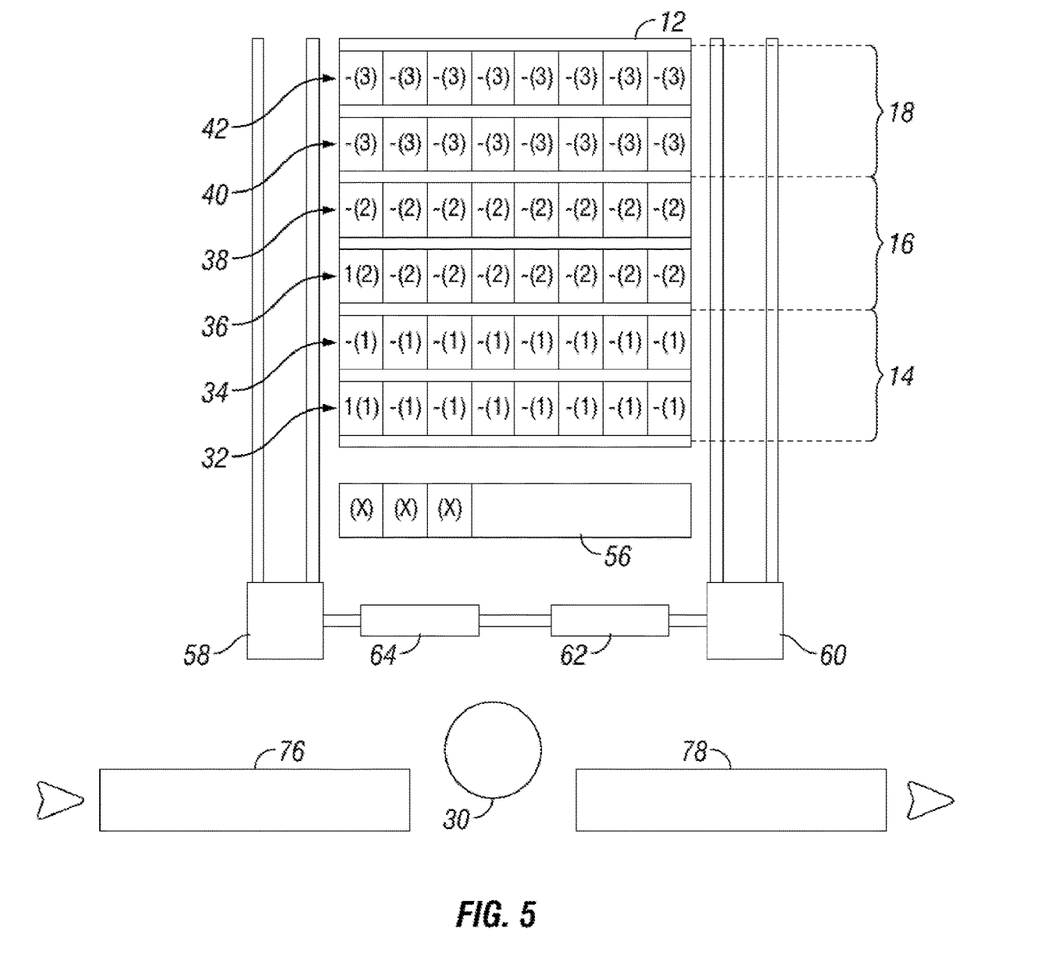
FIG. 5 is a schematic view of a step of the process of molding spokes in accordance with one exemplary embodiment.

FIG. 5 is a schematic view of the system and illustrates one step in the process of molding the spokes 10. Green spokes 20 are transported to the molding step via the uncrued spoke transport 76. A mold intervention area 56 is present in which molds (x) can be cleaned in preparation for receiving a green spoke 20 for curing. Still further, the molds (x) can be pre-heated in the mold intervention area 56 so that they are some temperature above ambient temperature before being placed within the platen press 12. In this regard, the molds (x) could be preheated to temperatures greater than 150 degrees Fahrenheit before being placed into the platen press 12. A robot 30 or human can transport a green spoke 20 from the uncured spoke transport 76 to the mold close area 64 at which time the green spoke 20 can be placed into a mold (x) and closed. Alternatively, the system can be arranged so that the green spoke 20 travels directly from the uncured spoke transport 76 to the mold (x) at the mold close area 64 and onto the mold (x) without need of a human or robot 30 to do this placing. The molds (x) that have green spokes 20 therein can be transported to the platen press 12 via a first transport 58. The first transport 58 can be configured to transport any number of molds (x) to the platen press 12 at the same time. For example, the first transport 58 may transport 1, 2, 3, 4, 5, 6, or from 7-30 molds (x) simultaneously to the platen press 12. The number of molds (x) that can be carried can be a function on the size of the molds (x). The first transport 58 could be configured to carry 10× of a mold of a first size, 4× of a mold of a second size where the mold of the second size is significantly larger than the mold of the first size. The first transport 58 may be arranged in a variety of manners, and in some embodiments may be a platform that runs on a track in only a linear direction back and forth.

The molds (x) are arranged within the platen press 12 so that molding/curing can take place utilizing molds (x) with green spokes 20 having different cure times. In this manner, molds (x) with different cure times can be cured with one another in the same platen press 12 at the same time. The molds (x) with less cure time will spend less time within the platen press 12 than those molds (x) requiring more cure time. The molds (x) are arranged in an array in a series of rows within the platen press 12 so that their time sequence in the platen press 12 can be easier realized. As used herein, the term "array" refers to the organizational structure of the mold 70 pattern within the platen press 12. The molds -(1) are identified as a first series 14. The molds -(1) of the first series 14 are positioned in a first row 32 and a second row 34. In other arrangements, only a single row 32, 34 can be present, and in yet other arrangements more than just the two rows 32, 34 of the first series 14 are present. Also, although immediately adjacent one another, the two rows 32, 34 of the first series 14 may be separated by rows of other series in other embodiments. The molds -(1) of the first series 14 are grouped into the first series 14 because they all carry green spokes 20 that require the same amount of cure time within the platen press 12.

A second series 16 is also included within the platen press 12 and includes molds -(2) that each have green spokes 20 that require the same amount of cure time within the platen press 12. The green spokes 20 of the second series 16 in the molds -(2) require an amount of time within the platen press 12 greater than the green spokes 20 of the first series 14. The molds -(2) are arranged in two rows 36, 38 that are immediately adjacent one another. As with the first series 14, the second series 16 could have any number of rows and these rows need not be immediately adjacent one another in other embodiments.

A third series 18 exists in the array and includes molds -(3) that are positioned within two rows 40, 42 that extend from one side of the platen press 12 to the other. The molds -(3) of the third series 18 carry green spokes 20 that require a different amount of cure time in the platen press 12 than do the green spokes 20 of molds -(1) and -(2). The green spokes 20 of the molds -(3) require a greater amount of time within the platen press 12 to cure the green spokes 20 they carry than do the molds -(1) and -(2). As with the first and second series 12, 16, any number of rows of the third series 18 can be present and these rows may be in sequence with one another or may be separated by rows of other mold series 14 or 16.

Although three series 14, 16, 18 are shown, it is to be understood that any number of series of molds can be present in other embodiments, and each of these series includes green spokes 20 that require a different cure time in the platen press 12. There may be from 4-6 series, from 7-10 series, from 11-15 series, or from 16-26 series in accordance with other exemplary embodiments. The rows 32, 34, 36, 38, 40, 42 are shown as extending across the width of the platen press 12, but need not extend the entire way across in other embodiments. In this regard, although all of the rows 32, 34, 36, 38, 40, 42 are shown being filled with molds, it is to be understood that there may be gaps in the rows 32, 34, 36, 38, 40, 42 such that they do not include molds all the way across but instead have some empty slots. Further, the rows 32, 34, 36, 38, 40, 42 although shown as being horizontally extending could instead be vertically extending with respect to a view downward into the platen press 12.

As used in the process, the molds of the first series 14 are labeled -(1) in which the "-" represents a mold of an unspecified number and the (1) represents the fact that this particular mold is a member of the first series 14. The molds of the second series 16 are labeled as having a designation -(2) and this signifies that the mold is of an unspecified number with the 2 meaning that this particular mold is a member of the second series 16. Likewise the molds of the third series 18 are labeled with a -(3) in which the "-" signifies a mold of an unidentified number and the (3) means it is a member of the third series 18 of molds. The molds in the intervention area 56 are not yet a member of any of the series 14, 16, or 18 and thus are simply given the designation (x), but will become one of the molds of the series 14, 16, or 18 once supplied with a green spoke 20 and put into the platen press 12.

The method includes positioning a first mold of the first series 1(1) into the first row 32 so that it is, at the position shown in FIG. 5, located on the extreme left-hand side slot of the first row 32. As used in describing the process, the 1 means that mold is designed the first mold and the number in parentheses is the series that mold is associated with. As such, mold 1(1) refers to the first mold of the first series. The first mold of the first series 1(1) could be placed there via transport to this position by the first transport 58. Also, at the same time the first mold of the first series 1(1) is within the platen press 12, the first mold of the second series 1(2) is also positioned within the platen press 12 so that these two molds 1(1) and 1(2) are simultaneously within the platen press 12. The first mold of the second series 1(2) is a member of the second series 16 and occupies the third row 36 and is in the extreme left-hand slot of the third row 36 in FIG. 5. The first mold of the second series 1(2) can be transported to the platen press 12 via the use of the first transport 58. The first mold of the second series 1(2) and the first mold of the first series 1(1) can be placed within the platen press 12 at the same time or can be placed into the platen press 12 at different points in time. Although the first mold of the second series 1(2) and the first mold of the first series 1(1) are located in the same vertical column, they need not be in the same column when they are first introduced into the platen press 12 in other embodiments. The platen press 12 may be closed and heat and pressure applied so that force and heat are applied to both the first mold 1(2) and the first mold 1(1) at the same time. The first mold 1(2) needs to have a longer cure time than the first mold 1(1) in the platen press 12 but they are cured simultaneously for at least some of their cure times.

Figure 6:
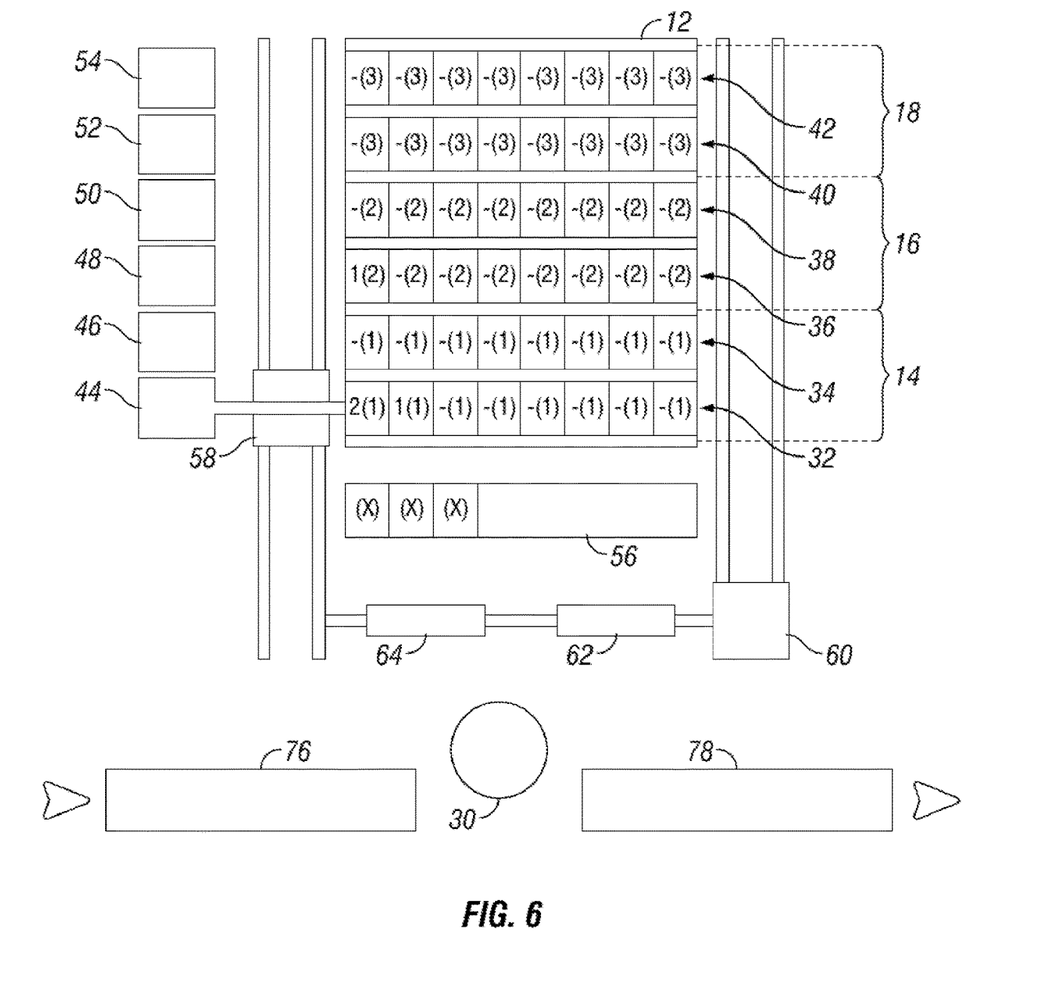
FIG. 6 is a schematic view of a future step of the process of molding spokes from that of FIG. 5 in which a new mold is placed into the first row.

FIG. 6 shows another step in the process which may occur after the snapshot in FIG. 5. Another one of the molds (x) in the intervention area 56 can be loaded with a green spoke 20 and closed at the mold close area 64. This mold (x) can be designated as the second mold of the first series 2(1) and is transported from the mold close area 64 by the first transport 58. The platen press 12 may be opened so that force is no longer applied to any of the molds within the platen press 12, including molds 1(1) and 1(2). Upon reaching the first row 32, a first series linear actuator 44 can be actuated to push the second mold 2(1) off of the first transport 58 and into the first row 32 at which point in time it engages the mold 1(1) and pushes the mold 1(1) into the next, subsequent slot in the platen press 12. When the mold 2(1) engages mold 1(1) and pushes it so that mold 1(1) moves, the mold 1(2) remains in the same position relative to the platen press 12. Although not shown in FIG. 6, if all of the available space in the platen press 12 is filled up, adding a mold into the platen press 12 will cause a mold at the opposite end to be pushed off of the platen press 12. The platen press 12 may be closed so that force and heat are applied to the molds 1(1), 2(1), 1(2) and the rest of the molds in the platen press 12 at the same time. Although the molds, for example 2(1) and 1(1), can push into another the process may not want to push metal to metal molds. Instead, transport rails that reduce the frictional coefficient of moving can be used. Also, rollers could be put into the molds to facilitate movement of the molds. As such, it is to be understood that various ways of moving adjacent molds are possible, and embodiments exist in which the molds to not contact and push one another to cycle the molds through the platen press 12.

Any device or method can be employed to move the molds from the first transport 58 to within the platen press 12. As shown, each row 32, 34, 36, 38, 40, 42 is associated with its own linear actuator. The first series linear actuator 44, which could be a pneumatic or hydraulic cylinder, pushes molds into the first row 32, and the first series linear actuator 46 pushes molds from the first transport 58 to the second row 34. Second series linear actuators 48, 50 push molds into the third row 36 and the fourth row 38. Third series linear actuators 52, 54 push molds into the fifth row 40 and the sixth row 42. However, in other embodiments, a single linear actuator may move to the necessary row 32, 34, 36, 38, 40, 42 and push the mold from the first transport 58 into it. Still further, multiple linear actuators may be present but can be set up so that they are associated with some but not all of the rows 32, 34, 36, 38, 40, 42 such that one is associated with the rows 32, 34 of the first series 14, one is associated with the rows 36, 38 of the second series 16, and one is associated with the rows 40, 42 of the third series 18. In still other embodiments, a linear actuator is carried by the first transport 58 so that when the first transport 58 is next to the desired row, it is actuated to push the mold off of the first transport 58 and into the row 32, 34, 36, 38, 40, 42 adjacent the first transport 58. In this embodiment, the linear actuator moves with the first transport 58 and its position is thus adjustable relative to the platen press 12.

Figure 7:
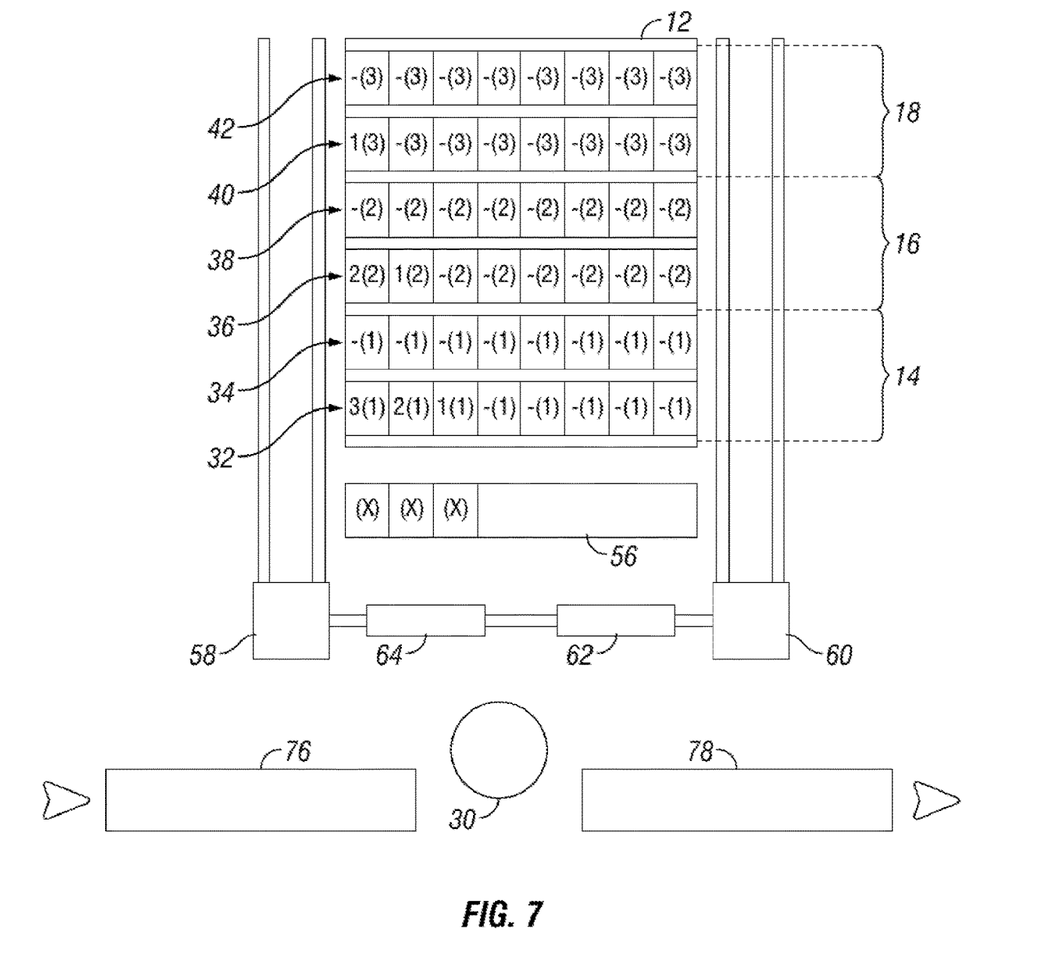
FIG. 7 is a schematic view of a future step of the process of molding spokes from that of FIG. 6 in which additional molds placed into the platen press are noted.

The method can continue loading molds into the platen press 12 and removing molds from the platen press 12 in accordance with the necessary cure times of the various green spokes 20 being cured within the platen press 12. For example, the platen press 12 could be opened so that force is no longer applied to any of the molds within the platen press 12, and three additional molds may be inserted into the platen press 12. FIG. 7 shows a step in the method in which a first mold of the third series 1(3) is inserted into the fifth row 40, and a second mold of the second series 2(2) is put in the third row 36 and engages and pushes the first mold 1(2) moving it out of its slot and taking its place. Additionally, a third mold of the first series 3(1) is put into the first row 32 to engage the second mold 2(1) and push it out of place to in turn take its place in the first row 32. All of the rows 32, 34, 36, 38, 40, 42 are filled with molds, so the insertion of the three molds 1(3), 2(2), and 3(1) causes three molds at the extreme right hand side of the platen press 12 to be pushed off of the platen press 12. The first mold 1(3) contains a green spoke 20 that requires a longer cure time than the molds 2(2), 1(2), 3(1), 2(1), 1(1). The platen press 12 can be closed to provide force and heat to all of the molds within the platen press 12 as shown in FIG. 7.

Figure 8:
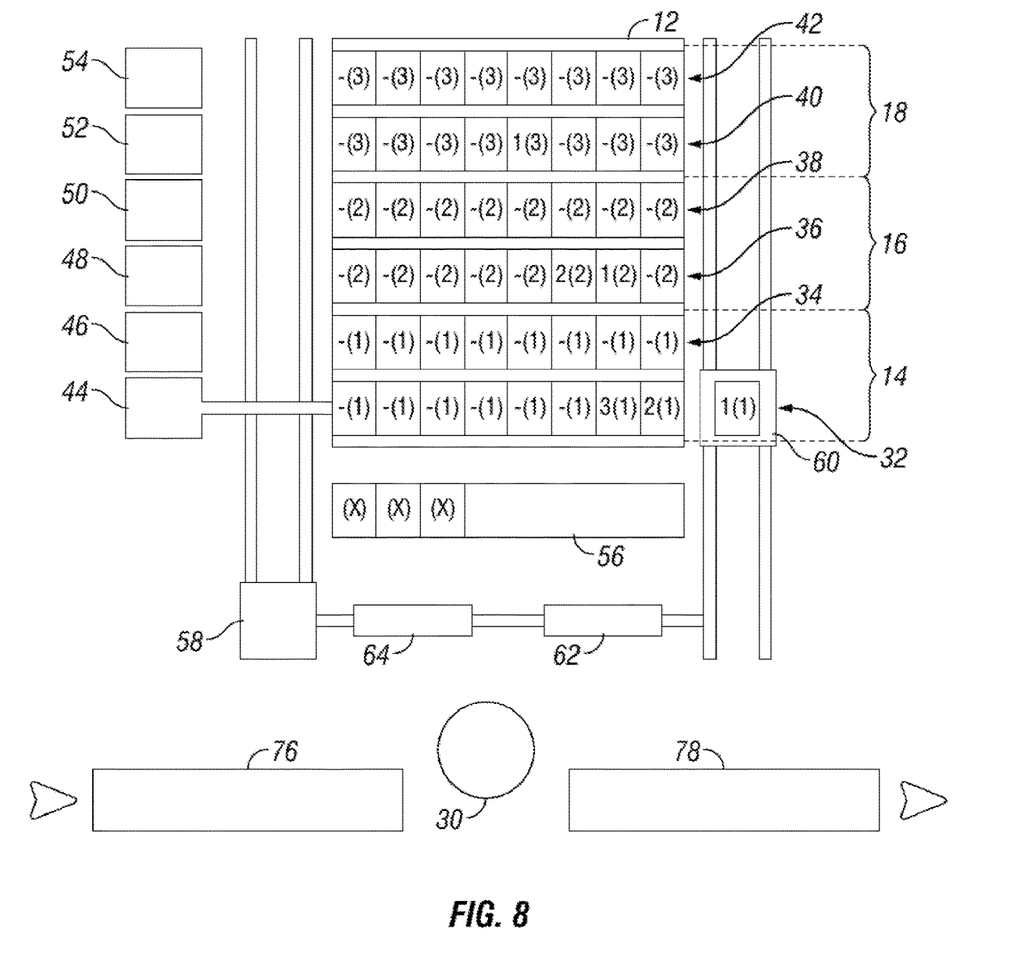
FIG. 8 is a schematic view of a future step of the process of molding spokes from that of FIG. 7 showing a mold with a cured spoke removed from the first row.

The method can continue to add molds to the platen press 12 and remove molds from the platen press 12 depending upon the required cure time of the molds of the various series 14, 16, 18. The green spokes 20 of the first series 14 require the shortest amount of cure time so they are cycled through the platen press 12 faster than the green spokes 20 in the molds of the second series 16 and the third series 18. In this regard, the molds in the first series 14 are inserted and removed faster than those of the second and third series 16, 18 so that they reach the right hand side of the platen press 12 faster than those of the second and third series 16 and 18. FIG. 8 shows a point in the molding method once the green spoke 20 in the first mold of the first series 1(1) has spent a sufficient amount of time within the platen press 12 so that the green spoke 20 is cured to become a cured spoke 22 and so that the mold 1(1) needs to be removed from the platen press 12. The first series linear actuator 44 is actuated to add a new mold -(1) to the first row 32 which in turn pushes all of the molds of the first row 32 one spot to the right causing the mold 2(1) to engage the mold 1(1) and push it onto the second transport 60 and out of the platen press 12. When the mold 1(1) is moved, none of the other molds of the second or third series 16, 18 such as molds 1(3), 2(2), 1(2) move in relation to the platen press 12 and their positions remain fixed with respect to the platen press 12.

The cured spoke 22 in the mold 1(1) could be transported from the platen press 12 via the second transport 60 to the mold open area 62. Here, the robot 30 or a human can open the mold 1(1), for instance by separating the top piece 24 from the bottom piece 26, and can demold the cured spoke 22 from the mold 1(1). The cured spoke 22 may then be placed by the robot 30 to the human onto the cured spoke transport 78 and transported away from the platen press 12 station to the next station in the production process. The mold 1(1) that was just opened could then be moved to the intervention area 56 and its surfaces can be cleaned and prepared for acceptance of a new green spoke 20 for subsequent transport back into the platen press 12 for curing.

The positioning of the molds in FIG. 8 can be seen in that molds having shorter cure times have been moved faster through the platen press 12 than those having longer cure times. The molds 1(1) and 1(2) although being introduced into the platen press 12 at the same time are no longer in the same column by the time the mold 1(1) exits the platen press 12 onto the second transport 60. The mold 1(2) is two slots behind the mold 1(1) upon the mold 1(1) exiting. Still further, the molds 3(1), 2(2), 1(3) were all introduced at the same time into the platen press 12 so that they were all on the left hand side in the same column at the same time upon introduction. During the curing process the mold 3(1) has advanced once slot ahead of the mold 2(2) and has advanced two slots relative to mold 3(1). Mold 2(2) is likewise one slot ahead of mold 1(3) in exiting the platen press 12. The molds of the various series 14, 16, 18 may advance at any rate faster or slower relative to one another through the platen press 12 and need not be just one or two slots separated from one another in other exemplary embodiments.

Figure 9:
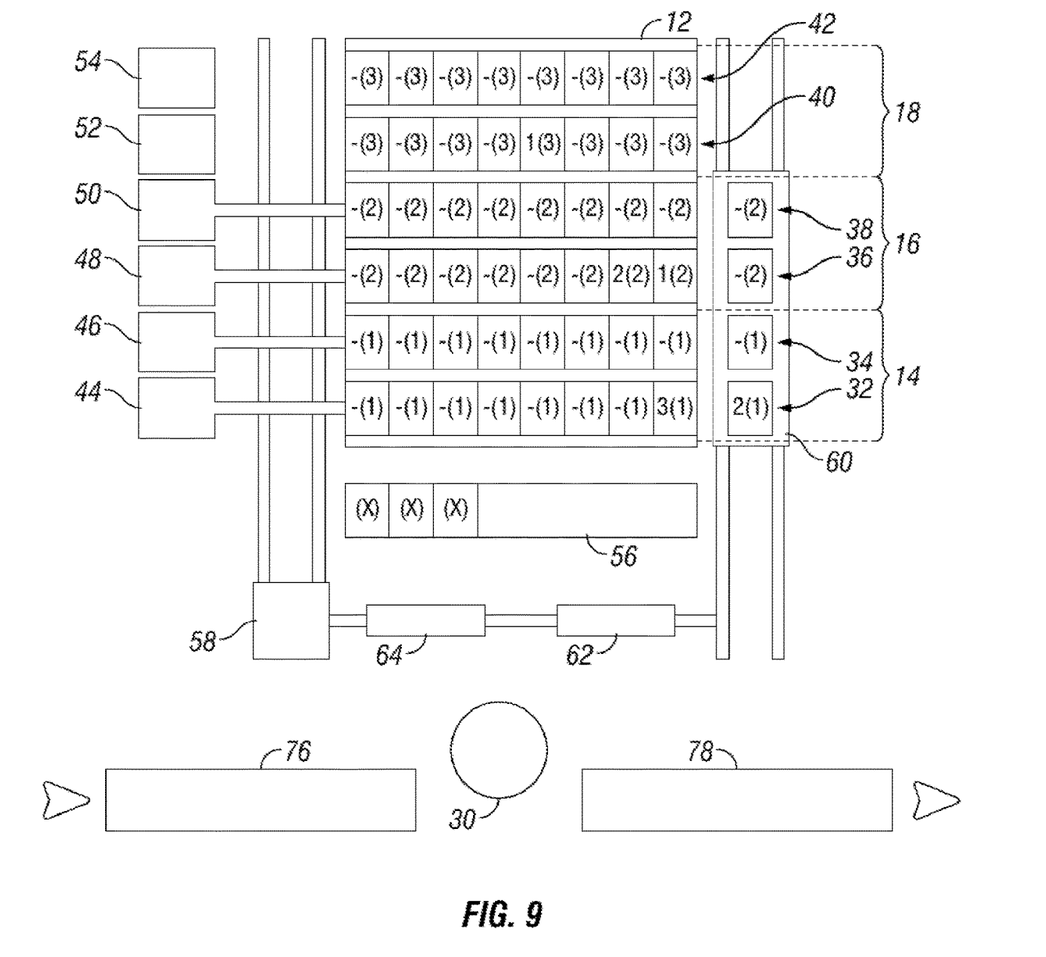
FIG. 9 is a schematic view of a future step of the process of molding spokes from that of FIG. 8 in which four molds with cured spokes are removed from the platen press.

A subsequent step in the curing method is illustrated with reference to FIG. 9. In this step, the platen press 12 is opened and green spokes 20 that have reached a sufficient cure to become cured spokes 22 are removed from the platen press 12. The linear actuators 44, 46, 48, 50 are actuated so that all molds of the first series 14 in rows 32 and 34 are moved, and so that all molds of the second series 16 in rows 36 and 38 are advanced one column to the right. Mold 2(1) exits the platen press 12 and is pushed by mold 3(1) onto the second transport 60. Molds -(2), -(2), and -(1) are likewise pushed onto the second transport 60 from rows 34, 36, 38. Four molds are shown on the second transport 60, but it is to be understood that any number of molds could be carried at the same time by either one of the transports 58 or 60. The molds -(3), including mold 1(3), remain stationary relative to the platen press 12 as all of the molds of the first series 14 and second series 16 are moved relative to the platen press 12. As such, any number of molds could be added to or removed from the platen press 12 at the same time. The various molds -(2), -(2), -(1), and 2(1) are transported to the mold open area 62 where the cured spokes 22 in them are demolded and the molds -(2), -(2), -(1), and 2(1) are then put into the intervention area 56 where they can be cleaned and pre-heated and then provided with new green spokes 20 for subsequent use and curing in the platen press 12.

Figure 10:
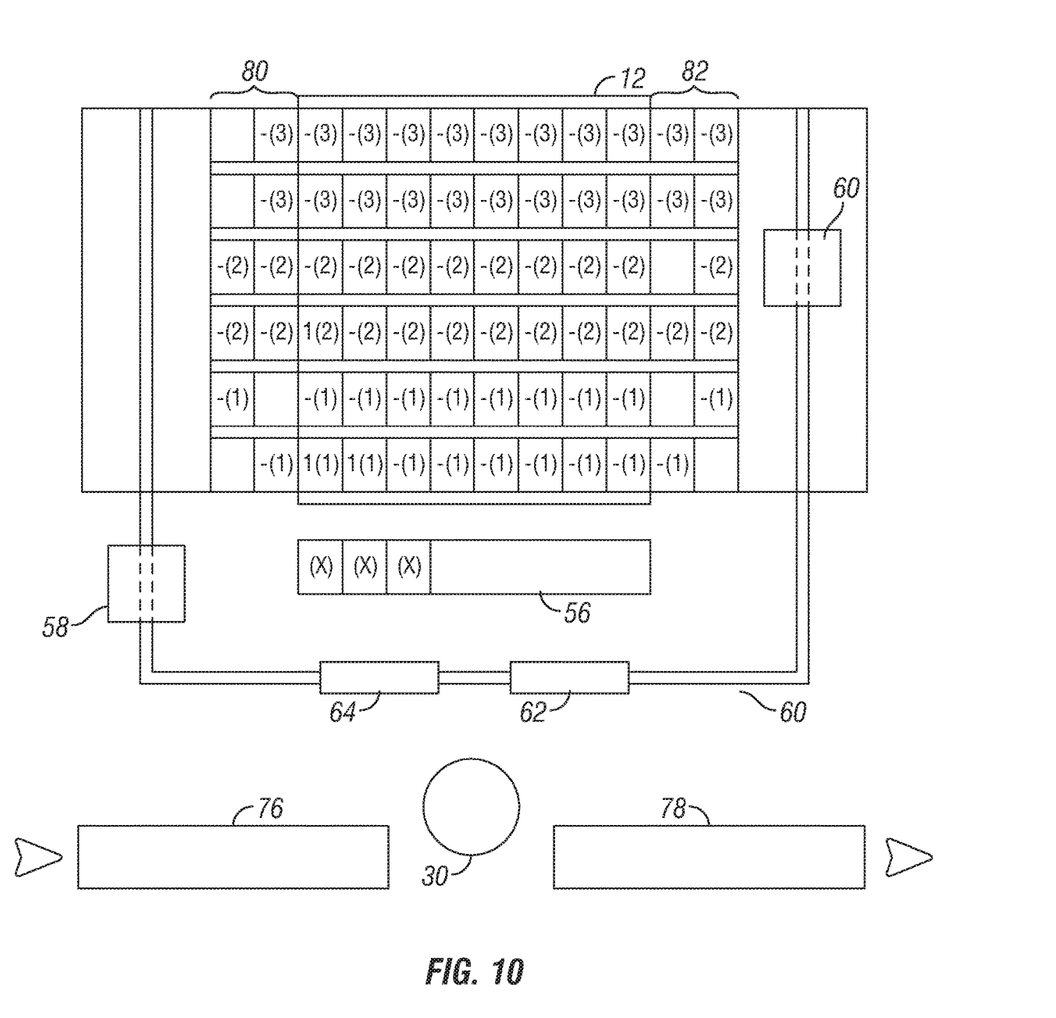
FIG. 10 is a schematic view that includes loading and unloading queues that can be utilized with any of the processes as disclosed herein.

FIG. 10 shows a system as previously discussed with the addition of a loading queue 80 and an unloading queue 82 located proximate to the platen press 12. Various molds -(1), -(2), -(3) can be transported to the loading queue 80 via the first transport 58 and can remain in the loading queue 80 until needed for placement into the platen press 12 for curing. The molds -(1), -(2), -(3) can be transported to the loading queue 80 one at a time, two at a time, or any number at a time by the first transport 58. The loading queue 80 can be filled any amount during the curing operation. Similarly, the unloading queue 82 may have any amount of molds -(1), -(2), -(3) with cured spokes therein awaiting transport via the second transport 60 to a mold open area 62. The second transport 60 can carry any number of the molds -(1), -(2), -(3) from the unloading queue 82. The use of queues 80, 82 may allow for a more efficient cycling of the molds into and out of the platen press 12 and for curing within the platen press 12.

Figure 11:
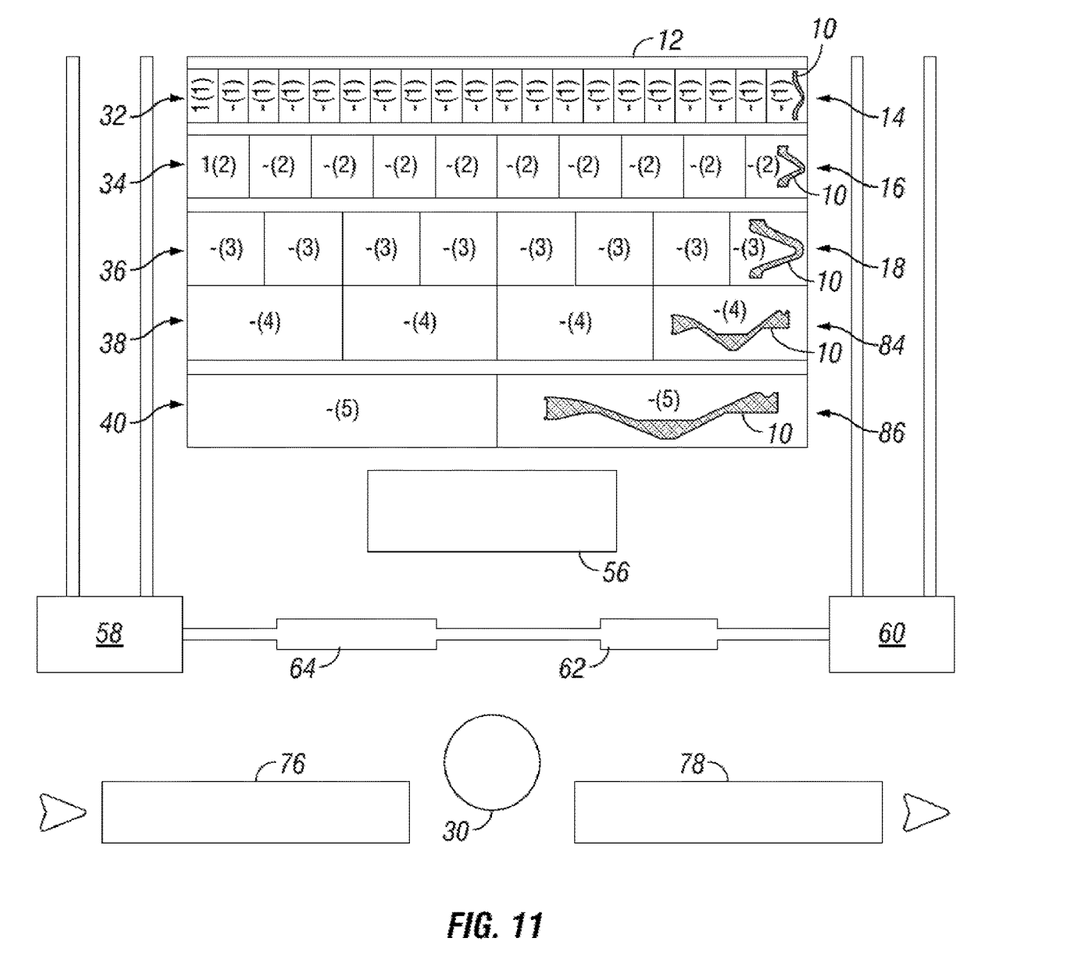
FIG. 11 is a schematic view of the method that illustrates molds that cure different sized spokes that can be in the platen press at the same time.

FIG. 11 illustrates different sized spokes 10 being molded by the process. It is to be understood that as shown herein, the molds can be of different sizes and the spokes 10 in those molds can likewise be sized differently relative to one another. As such, even if the molds are shown as having the same size in the drawings, this is only a schematic representation of the process and the molds can be differently sized relative to one another during implementation of the process. FIG. 11 however explicitly shows the molds as having different sizes for use in curing spokes 10 likewise having different sizes. The first series 14 includes 20 molds with spokes 10 that are the smallest in size that are cured and that require the least amount of time within the platen press 12 for curing. The spokes 10 of the first series 14 are located within the first row 32. The second series 16 of spokes 10 is greater in size than those of the first series 14 and will require more time within the platen press 12. The second series 16 are within the second row 34. A third series 18 in the third row 36, a fourth series 84 in the fourth row 38, and a fifth series 86 in the fifth row 40 are present with the spokes 10 of these series 36, 84, 86 likewise increasing in size such that the spokes 10 of the fifth series 86 are the largest and require the most time within the platen press 12. There are 10 spokes 10 in the second series, 8 spokes 10 in the third series 18, 4 spokes 10 in the fourth series 84, and 2 spokes 10 in the fifth series 86. The spokes 10 of the different series 14, 16, 18, 84, 86 are all of different sizes and all require different lengths of time within the platen press 12 for curing. These molds, like those in other embodiments, can be transferred on a rail system to, through, and away from the platen press 12. The transferring can be accomplished by using hydraulic or spring loaded rollers that push the molds up from the bottom of the platen press 12 for the push/pull operation.

Although FIG. 11 shows five series 14, 16, 18, 84, 86 with different numbers of molds in each one of the series, any number of series with any number of molds can be used in other embodiments. Further, different series 14, 16, 18, 84, 86 could have the same number of molds in some embodiments. The following table illustrates one possible configuration of the process using five series 14, 16, 18, 84, 86 having different numbers of spokes 10 with different cure times:

| Series | DSP | Molds per line | Bump cycle frequency | Molds in & out per bump | Bump cycle req per 1 in/out | Moves per hour | Moves per day |
|---|---|---|---|---|---|---|---|
| 1 | 10 | 20 | 1 | 2.000 | 0.5 | 120 | 2880 |
| 2 | 13 | 10 | 1 | 0.769 | 1.3 | 46.2 | 1107.7 |
| 3 | 17 | 8 | 1 | 0.471 | 2.1 | 28.2 | 677.6 |
| 4 | 30 | 4 | 1 | 0.133 | 7.5 | 8 | 192 |
| 5 | 90 | 2 | 1 | 0.022 | 45.0 | 1.3 | 32.0 |

The spokes 10 in the various series 14, 16, 18, 84, 86 require different amounts of curing time within the platin 12 and the transferring of the spokes 10 through the platin 12 can be timed with a bump cycle such that when a bump cycle takes place in the platin 12 the spokes 10 are transferred.

The method of curing thus utilizes molds that carry spokes 10 that may require different cure times. In other embodiments, the cure times of the spokes 10 may not be different from one another as used in the present method. Depending upon the cure times and the number of molds within the platen press 12, it may be the case that some molds placed into the platen press 12 are empty of green spokes 20 for curing but instead are put into the platen press 12 for spacing purposes due to the timing of the cure times for the different series 14, 16, 18 in the array and for the number of mold spaces within the platen press 12. As such, it is to be understood that not all of the molds within the platen press 12 include a green spoke 10. Further, although described as having a single green spoke 20 within each one of the molds, it is the case that in some embodiments the molds put into the platen press 12 may include 2, 3, 4, from 5-10, from 11-20, or from 21-30 green spokes 20 in other embodiments.

In some embodiments, the green spokes 20 of the first series 14 have a cure time within the platen press 12 of 8 minutes, and the green spokes 20 of the second series 16 have a cure time within the platen press 12 of 10 minutes, and the green spokes 20 of the third series 18 have a cure time within the platen press 12 of 12 minutes. In some instances, the robot 30 could provide as much or as little automation as needed or desired in the method. For example, the robot 30 could open the molds (x), place the green spoke 20 within the mold (x), close the mold (x) with the green spoke 20 therein, and move the closed mold (x) with the green spoke 20 onto the first transport 58. In other arrangements, the opening and closing of molds (x) could be done by fixtures, or could be done manually. The cured spoke 22 could be demolded from the mold (x) by the robot 30 or by a human operator.

The various series 14, 16, 18 can undergo a cycle at set frequencies to allow the mold with the cured spokes 22 to be pushed out of the platen press 12 by a mold having a green spoke 20. The opening of the platen press 12 may also function simultaneously as a bump cycle in some instances as pressure is released from the platen press 12 allowing air to escape. However, the cycle to move the molds need not constitute a bump cycle in all embodiments. If pressure from the platen press 12 is not needed for the curing, the molds may still be put into the platen press 12 for increased temperature. The platen press 12 may have a top that moves up and down by the actuation of a piston, and the top of the platen press 12 need not move the entire way up, thus less than the entire stroke of the piston, when inserting and removing molds 70 from within the platen press 12. The top need only be moved up a distance short enough to allow the molds 70 to be pushed into and out of the platen press 12. Opening of the platen press 12 with less than its entire capability provides lower cycle time in the production process.

The present method allows for the curing of multiple spokes 10 with different cure laws in the same platen press 12. Also, spokes 10 having different sizes and/or cure laws can be changed during production with the simple removal and replacement of the mold 70 subassemblies into and out of the system. As such, different types of spokes 10, whether they be of different materials, sizes, or configurations, can be all molded at the same time within the same platen press 12. The transport method of molds 70 into and out of the platen press 12 minimizes the amount of piston stroke needed by the platen press 12 and reduces temperature fluctuations of the molds 70 within the platen press 12. In putting molds 70 into and out of the platen press 12, a bump/breathe cycle can be utilized to allow air trapped within the molds 70 to escape. However, the movement of molds 70 in opening the platen press 12 may or may not constitute a bump cycle as is used in some instances of molding with a platen press 12. Although a single platen press 12 level is shown and described, it is to be understood that the rows of molds 70 could be arranged in a multi-level platen press 12 that has various floors positioned vertically higher and lower than one another.

The method can allow one to mold a certain type of spoke 10 with the first series 14, and then once the last mold -(1) of the first series 14 is removed, a spoke 10 of a second series 16 can be put into the same line as the molds -(1) that were creating the first series 14. As such, the line can be converted over in transition from spokes 10 of one size/configuration to spokes 10 of a different size/configuration. The embodiments illustrated show the different series 14, 16, 18 in different rows of the platen press 12, but it is to be understood that the different series 14, 16, 18 could be put into the same row of the platen press 12 in other embodiments to effect a transition in that particular row from one series 14, 16, 18 to the next.

Any type of mold 70 can be adapted for use with the present process. The molds 70 could be a single mold assembly or a multi-cavity mold assembly. Further, the molds 70 may be self-locking or otherwise capable of applying some force to the green spoke 20 therein and so that additional force can be imparted via the platen press 12. The platen press 12 could be a fixed platen press 12 or a floating platen press 12, and the molds 70 used may be floating platen molds 70 or fixed platen molds 70. The molds 70 could have top halves and bottom halves that move with one another into and out of the platen press 12. Alternatively, some embodiments are possible in which one of the halves, for example the top half, of the mold 70 is fixed in the platen press 12 while the bottom half of the mold 70 moves into and out of the platen press 12.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A method of curing spokes of a non-pneumatic tire, comprising:
    providing a platen press;
    providing a first mold of a first series of molds, wherein the first mold of the first series of molds is configured for molding a spoke;
    providing a second mold of the first series of molds, wherein the second mold of the first series of molds is configured for molding a spoke;
    providing a first mold of a second series of molds, wherein the first mold of the second series of molds is configured for molding a spoke;
    placing the first mold of the first series of molds and the first mold of the second series of molds within the platen press;
    applying force to the first mold of the first series of molds and the first mold of the second series of molds by the platen press, and heating the first mold of the first series of molds and the first mold of the second series of molds;
    opening the platen press;
    placing the second mold of the first series of molds within the platen press;
    applying force to the first mold of the first series of molds, the second mold of the first series of molds, and the first mold of the second series of molds by the platen press, and heating the first mold of the first series of molds, the second mold of the first series of molds, and the first mold of the second series of molds;
    opening the platen press;
    removing the first mold of the first series of molds from the platen press while keeping the second mold of the first series of molds within the platen press; and
    removing a cured spoke from the first mold of the first series of molds;
    wherein all of the molds of the first series of molds spend less time within the platen press than all of the molds of the second series of molds for curing.

2. The method as set forth in claim 1, further comprising moving the first mold of the first series of molds relative to the platen press while keeping the position of the first mold of the second series of molds the same relative to the platen press.

3. The method as set forth in claim 1, further comprising:
    after the removal of the first mold of the first series of molds from the platen press, applying force to the second mold of the first series of molds and to the first mold of the second series of molds by the platen press, and heating the second mold of the first series of molds and the first mold of the second series of molds;
    removing the second mold of the first series of molds and the first mold of the second series of molds from the platen press; and opening the second mold of the first series of molds and the first mold of the second series of molds and removing cured spokes therefrom.

4. The method as set forth in claim 1, further comprising:
providing a third mold of the first series of molds, wherein the third mold of the first series of molds is configured for molding a spoke;
providing a second mold of the second series of molds, wherein the second mold of the second series of molds is configured for molding a spoke;
providing a first mold of a third series of molds, wherein the first mold of the third series of molds is configured for molding a spoke;
placing the third mold of the first series of molds, the second mold of the second series of molds, and the first mold of the third series of molds within the platen press;
applying force to the third mold of the first series of molds, the second mold of the second series of molds, and the first mold of the third series of molds by the platen press and applying heat to the third mold of the first series of molds, the second mold of the second series of molds, and the first mold of the third series of molds at the same time the force and heat are applied to the first mold of the first series of molds and the first mold of the second series of molds; and
wherein when the first mold of the first series of molds is removed from the platen press, the third mold of the first series of molds, the second mold of the second series of molds, and the first mold of the third series of molds remain within the platen press;
wherein all of the molds of the second series of molds spend less time within the platen press than all of the molds of the third series of molds.

5. The method as set forth in claim 4, wherein the first mold of the second series of molds spends less time within the platen press than does the first mold of the third series of molds, and wherein the third mold of the first series of molds spends less time within the platen press than does the first mold of the third series of molds.

6. The method as set forth in claim 4, wherein the placing of the third mold of the first series of molds, the second mold of the second series of molds, and the first mold of the third series of molds within the platen press takes place before any force is applied to the third mold of the first series of molds, the second mold of the second series of molds, and the first mold of the third series of molds by the platen press.

7. The method as set forth in claim 2, wherein the molds of the second series of molds are larger in size than the molds of the first series of molds such that the spokes cured by the second series of molds are larger than the spokes cured by the first series of molds.

8. The method as set forth in claim 1, further comprising:
placing green spokes into the first mold of the first series of molds, the second mold of the first series of molds, and the first mold of the second series of molds by a robot;
closing the first mold of the first series of molds, the second mold of the first series of molds, and the first mold of the second series of molds by the robot;
opening the first mold of the first series of molds, the second mold of the first series of molds, and the first mold of the second series of molds by the robot; and
removing cured spokes from the second mold of the first series of molds and the first mold of the second series of molds by the robot;
wherein the robot removes the cured spoke from the first mold of the first series of molds.

9. The method as set forth in claim 1, wherein the first mold of the first series of molds and the first mold of the second series of molds are placed within the platen press at the same time.

10. The method as set forth in claim 1, wherein the molds of the first series of molds are arranged into rows within the platen press, and wherein the molds of the second series of molds are arranged into rows within the platen press, and wherein the rows of the first series of molds are different rows than the rows of the second series of molds.

11. The method as set forth in claim 1, wherein a first series linear actuator effects movement of the first mold of the first series of molds and the second mold of the first series of molds through the platen press;
wherein a second series linear actuator effects movement of the first mold of the second series of molds through the platen press.

12. The method as set forth in claim 1, further comprising:
cleaning and pre-heating the first mold of the first series of molds in an intervention area;
cleaning and pre-heating the second mold of the first series of molds in the intervention area;
cleaning and pre-heating the first mold of the second series of molds in the intervention area.

13. The method as set forth in claim 1, wherein the first series of molds are configured for molding smaller spokes than the spokes molded by configuration of the second series of molds.

14. The method as set forth in claim 1, further comprising:
transporting the first mold of the first series of molds, the second mold of the first series of molds, and the first mold of the second series of molds to the platen press via a first transport; and
transporting the first mold of the first series of molds, the second mold of the first series of molds, and the first mold of the second series of molds from the platen press via a second transport.

* * * * *